United States Patent [19]

De Regnaucourt

[11] 3,811,735
[45] May 21, 1974

[54] POSITIONED CLAMP LUGS FOR A DUAL RIM AND WHEEL ASSEMBLY

[75] Inventor: Robert A. De Regnaucourt, Centerville, Ohio

[73] Assignee: The Dayton Steel Foundry Company, Dayton, Ohio

[22] Filed: June 26, 1972

[21] Appl. No.: 266,213

[52] U.S. Cl. .............................. 301/13 R, 301/11 R
[51] Int. Cl............................................. B60b 23/00
[58] Field of Search .......... 301/12 R, 13 R, 13 SM, 301/9 R, 10 R, 11 R, 18, 19, 20, 36 R

[56] References Cited
UNITED STATES PATENTS

| | | | |
|---|---|---|---|
| 2,486,569 | 11/1949 | Malthaner | 301/36 R |
| 2,261,637 | 11/1941 | Ash | 301/13 R |
| 3,160,441 | 12/1964 | Walther | 301/12 R |

Primary Examiner—Richard J. Johnson
Assistant Examiner—Reinhard J. Eisenzopf
Attorney, Agent, or Firm—Mack D. Cook, II

[57] ABSTRACT

A dual rim and wheel assembly including as clamping elements a series of axially inner clamp means and a series of axially outer clamp lugs to cooperatively engage the mounting flanges of dual rims separated by a spacer. Each set of clamp means and a clamp lug is supported by a common fastening element extending axially through the wheel. The fastening elements carry fastening means which when tightened draw the clamp means and clamp lugs together to seat the rim flanges and assure lateral alignment. Means are provided so that selected clamp lugs are first bottomed out against the wheel when the fastening means therefor are tightened to minimize radial runout when the remaining fastening means are tightened.

1 Claim, 4 Drawing Figures

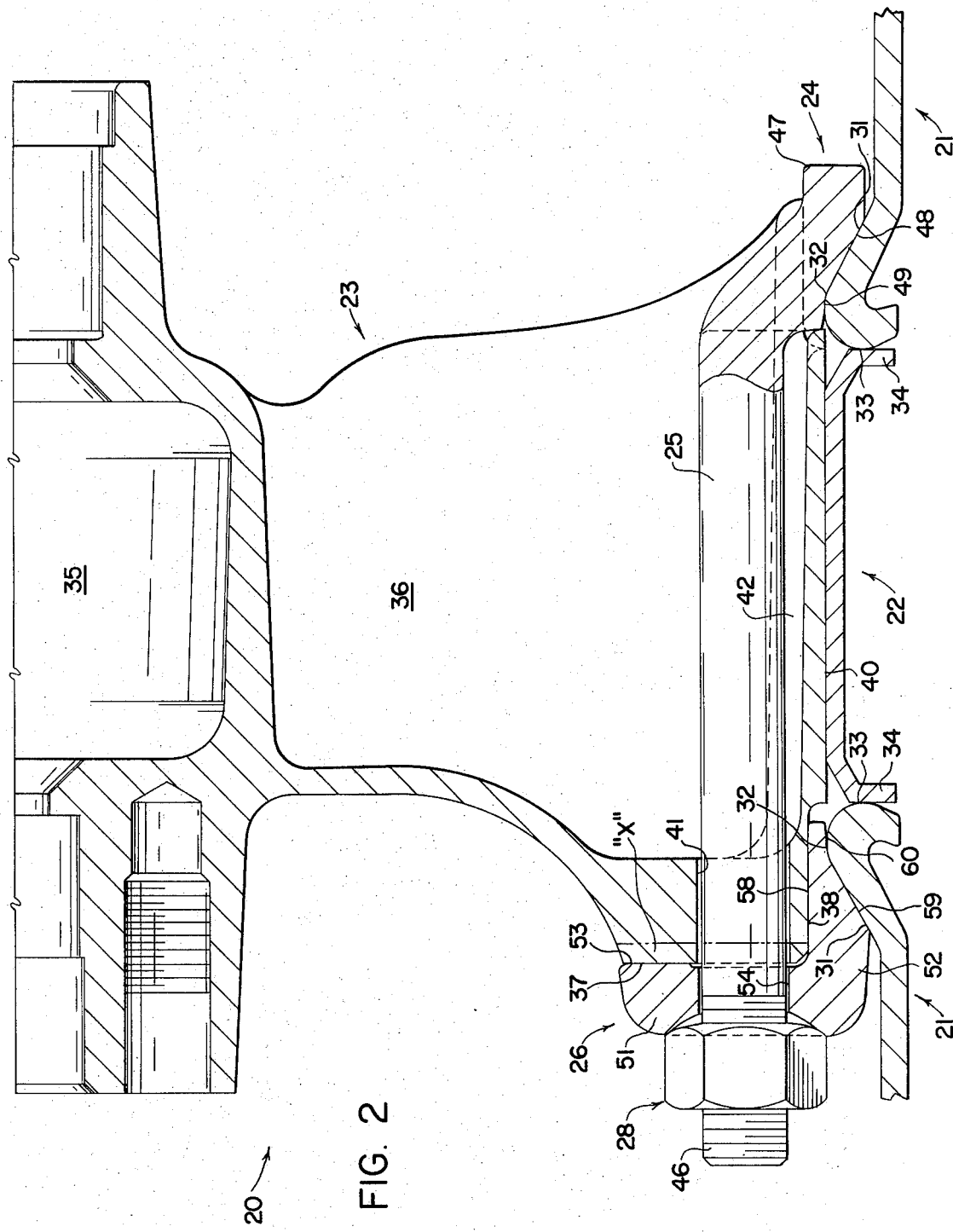

POSITIONED CLAMP LUGS FOR A DUAL RIM AND WHEEL ASSEMBLY

CROSS-REFERENCE TO RELATED APPLICATIONS

The use as clamping elements of sets of axially inner clamp means and axially outer clamp lugs supported by fastening elements extending axially through the wheel and carrying fastening means thereon, is the subject matter of co-pending application Ser. No. 252,412, filed May 11, 1972.

BACKGROUND OF THE INVENTION

The invention relates to a dual rim and wheel assembly. More particularly, the invention relates to an improvement for the dual rim and wheel assembly of co-pending application Ser. No. 252,412, filed May 11, 1972, whereby dual tire carrying rims are mounted on a wheel, such as a rear wheel, of a vehicle, such as a truck or trailer.

The dual rim and wheel assembly of co-pending application [Attorney's Docket Number 1621], includes a series of axially inner clamp means and a series of axially outer clamp lugs to cooperatively engage the mounting flanges of dual rims separated by a spacer. The clamp means and clamp lugs each have intersecting surfaces for engaging seating and positioning surfaces on the dual rims. Each set of a clamp means and a clamp lug is supported by a fastening element extending axially through the wheel. The common fastening elements carry fastening means which draw the clamp means and clamp lugs together to seat the rim flanges. It has been found that when the clamping elements are properly located and the fastening means are tightened with reasonable care, that a dual rim and wheel assembly is provided which will assure lateral alignment and minimize radial runout of the rims when mounted on the wheel.

However, it has now been found that a "human element" does exist. Despite the fact that good "judgment" would indicate otherwise, sometimes the mechanic will inadvertently tighten the first clamp lug too much and thereby cause radial misalignment of the rims even though lateral alignment is held. In other words, it has been found that under extreme circumstances even a dual rim and wheel assembly according to co-pending application Ser. No. 252,412, filed May 11, 1972, will not always minimize radial runout. The improvements provided by the present invention are intended to minimize radial runout, regardless of the lack of technique or poor "judgment" employed by the mechanic in assembling the rims on a wheel.

SUMMARY OF THE INVENTION

The object of the invention is to provide an improved dual rim and wheel assembly.

It is a further object of the invention to provide an improved dual rim and wheel assembly, where the clamping elements are sets of axially inner clamp means and axially outer clamp lugs supported by fastening elements extending axially through the wheel and carrying fastening means thereon, with means so that selected clamp lugs are bottomed out against the wheel when tightened to minimize radial runout when all of the fastening means are tightened.

These and other objects of the invention, and the advantages thereof, will be apparent in view of the Description of a Preferred Embodiment and an Alternative Embodiment as set forth below.

In general, a dual rim and wheel assembly according to the invention has clamping elements including a series of axially inner clamp means and a series of axially outer clamp lugs to cooperatively engage the mounting flanges of dual rims separated by a spacer. The wheel has means thereon wherein selected clamp lugs are bottomed out against a radially oriented boss surface on the wheel during tightening.

In the Preferred Embodiment of the invention, each set of a clamp means and a clamp lug is supported by a common fastening element extending through a bore in the wheel. Each fastening element carries a fastening means which when tightened will move the clamp means and clamp lugs to cooperatively engage the mounting flanges of dual rims separated by a spacer. Each of the wheel bores opens onto a radially oriented boss surface. Certain of the boss surfaces are axially extended further than an adjacent boss surface so that a clamp lug supported by a fastening element will move against the wheel boss surface when a fastening means therefor is tightened.

DESCRIPTION OF THE DRAWINGS

FIG. 2 is a fragmentary sectional view of the preferred embodiment of the invention, showing the wheel portion substantially as indicated on line 2—2 of FIG. 1.

DETAILED DESCRIPTION OF THE INVENTION

Figure 3:
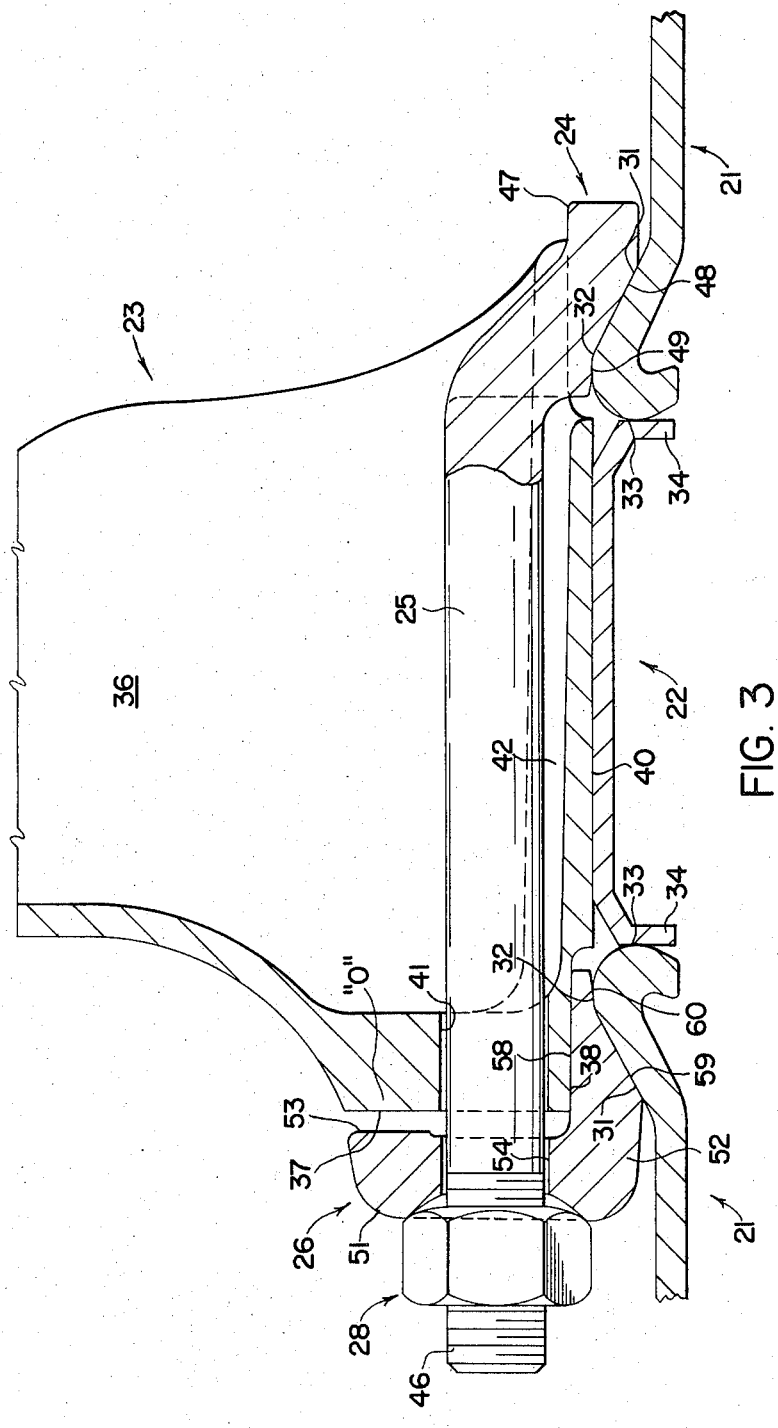
FIG. 3 is a fragmentary sectional view of the preferred embodiment of the invention, showing the wheel portion substantially as indicated on line 3—3 of FIG. 1.

A dual rim and wheel assembly, with means thereon so that selected clamp lugs are first bottomed out against the wheel when the fastening means therefor are tightened, is referred to generally by the numeral 20. As shown in FIGS. 2 and 3, in an assembly 20 the dual rims are mounted on the wheel and using the clamping elements which are the subject matter of co-pending application Ser. No. 252,412, filed May 11, 1972. The assembly 20 is characterized in that the clamping elements, rather than the wheel, per se, provide a felloe, felly or load-bearing surfaces for the rim.

In an assembly 20, the dual inner and outer rims are referred to generally by the numeral 21. Spacer is referred to generally by the numeral 22. The wheel is referred to generally by the numeral 23. The rims 21 are seated against the spacer by the cooperative action of clamping elements comprising an axially inner clamp means referred to generally by the numeral 24, a fastening element referred to generally by the numeral 25, an axially outer clamp lug referred to generally by the numeral 26, and a fastening means referred to generally by the numeral 28.

Each rim 21 may be a conventional flat base rim having a fixed bead flange and a removable bead flange (not shown). As shown, the mounting flange of a rim 21 has an axially inner holding surface 31, preferably inclined at an angle 28° from the rotational axis of the rim. The holding surface 31 intersects and merges into a radially inner seating surface 32, preferably axially oriented substantially horizontal or parallel to the rotational axis of the rim. The seating surface 32 intersects and merges into an axially outer gutter or positioning surface 33, preferably radially oriented substantially vertical or perpendicular to the rotational axis of the rim. The rim mounting surfaces 31, 32 and 33 depict a conventional form of a mounting flange for rims which may be assembled on a wheel using a spacer according to the invention. The angularity of these surfaces could be varied somewhat in relation to the rotational axis of the rims while still utilizing the subject matter of the invention.

The rigid spacer 22 is a conventional annular spacer or spacer ring carried on a wheel surface. The spacer has lateral flanges or marginal portions 34 carried by a noncompressible medial portion. The spacer edges 34 are preferably oriented substantially vertical or perpendicular to the rotational axis of the wheel 23.

Figure 1:
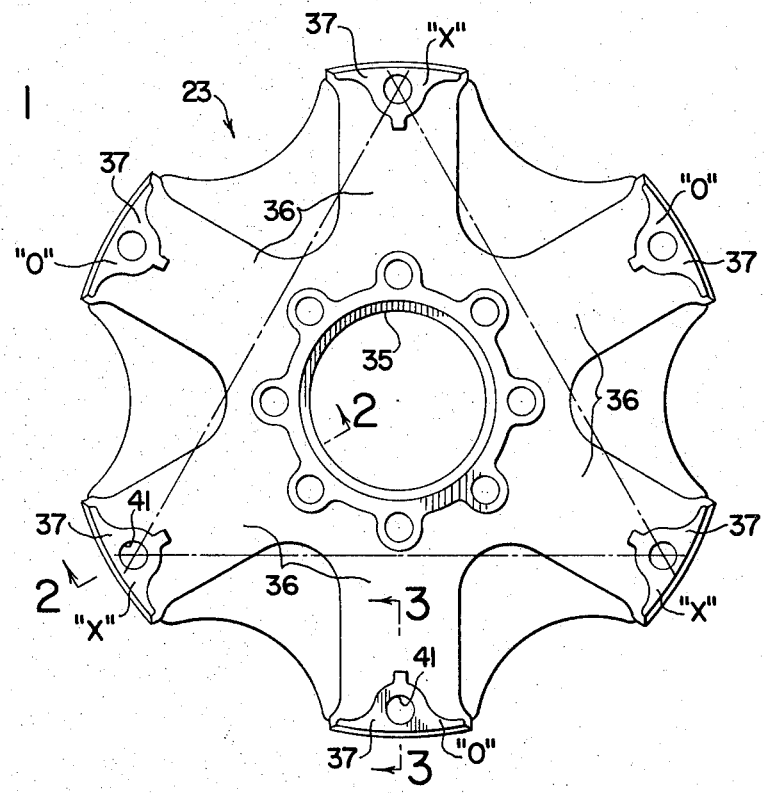
FIG. 1 is a plan view of a six-spoked wheel for use in a dual rim and wheel assembly according to the invention.
Figure 4:
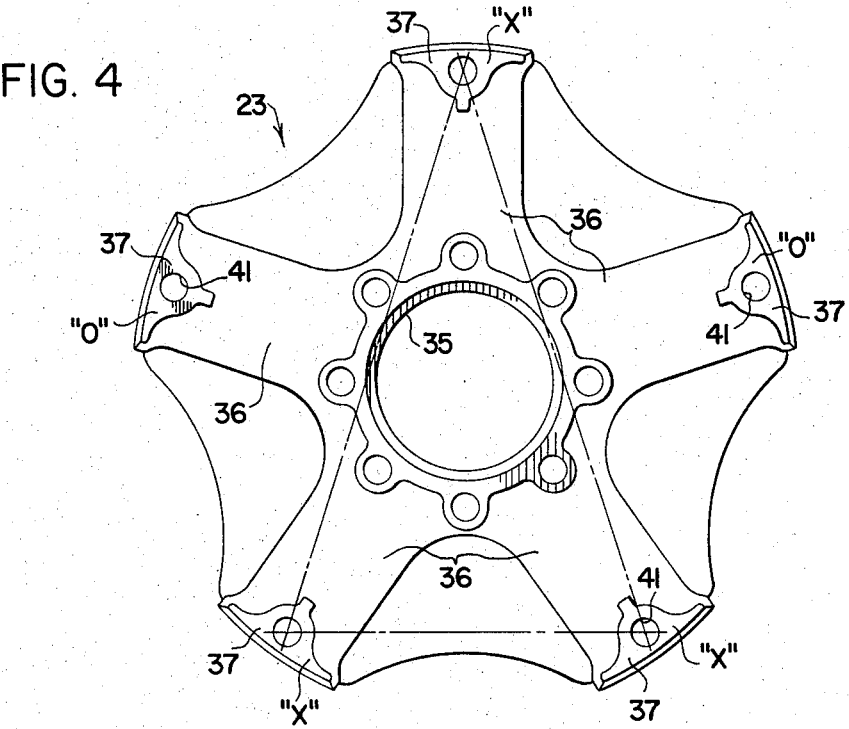
FIG. 4 is a plan view of a five-spoked wheel for use in a dual rim and wheel assembly according to the invention.

The wheel 23 may be either a cast spoked wheel or a disc wheel, formed by stamping or forging. As shown in FIGS. 1–4, the wheel 23 is a spoked wheel having a conventional hub area 35. The wheel shown in FIGS. 1, 2 and 3 is a six-spoked wheel, the wheel 23 shown in FIG. 4 is a five-spoked wheel.

The peripheral portion of each spoke 36 has a boss surface 37 radially oriented substantially vertically or perpendicular to the rotational axis of the wheel, an intersecting concave surface 38 axially oriented substantially horizontal or parallel to the rotational axis of the wheel, and a larger diameter axially extended medial surface 40 oriented substantially horizontal or parallel to the rotational axis of the wheel. The surfaces 38 seat the clamp lugs 26. The surfaces 40 carry the spacer 22.

An axially oriented bore 41, loosely receiving the shank of the fastening elements in the form of support bolts 25 for the clamp means 24 and clamp lugs 26, extends through the peripheral portion of a wheel 23 radially inwardly of the surface 38. The outer end of a bore 41 opens onto boss surface 37. The inner end of a bore 41 opens into an open area 42 radially inwardly of the medial surface 40.

A clamp means 24 is a one-piece solid element. The bolt portion 25 thereof, threaded as at 46 for engagement with a fastening means 28 in the form of a nut, extends through a wheel bore 41 and parallel to the wheel surface 40 to join with a wedge portion 47. The radially outer face of a wedge portion 47 has a conical surface 48 and an intersecting axially oriented surface 49. A conical surface 48 matingly engages a correspondingly inclined inner rim flange mounting surface 31. An axially oriented surface 49 matingly engages an inner rim flange seating surface 32.

A clamp lug 26 has a radially directed leg 51 and an axially directed leg 52 and the general shape of a conventional clamp lug, such as element 14 disclosed in U.S. Pat. No. 3,160,441, patented December/1964, to The Dayton Steel Foundry Company.

A clamp lug radial leg 51 is generally triangular in shape having a radially oriented stop surface 53 facing toward a wheel boss surface 37. A leg 51 also has an axially oriented bore 54 for receiving a support bolt 25. The bore 54 is centered so that a support bolt 25 will be axially oriented substantially horizontal or parallel to the rotational axis of the wheel when a clamp lug axial leg 52 is seated on a wheel surface 38.

A clamp lug axial leg 52 has an axially oriented convex surface 58 for sliding and seating engagement with a wheel surface 38. The radially outer face of the axial leg 52 has a conical surface 59 and an intersecting axially oriented surface 60. A conical surface 59 matingly engages a correspondingly inclined outer rim flange mounting surface 31. An axially oriented surface 60 matingly engages an outer rim flange seating surface 32.

In the Preferred Embodiment of the invention, certain of the boss surfaces 37 are axially extended further than an adjacent boss surface so that a clamp lug surface 53 will move against a boss surface 37 and "bottom out" when a fastening means 28 is tightened.

In FIGS. 1, 2 and 4, the axially extended boss surfaces are indicated by the letter X. In FIGS. 1, 3 and 4, the nonextended or "normal" boss surfaces 37 are referred to by the letter O.

In the six-spoked wheel of FIG. 1, every other boss surface 37 is axially extended. In the five-spoked wheel of FIG. 2, the axially extended boss surfaces 37 are triangularly oriented.

The mechanic mounting a dual rim and wheel assembly 20 according to the invention is instructed to first tighten the fastening means 28 on the X spokes. The mechanic is then instructed to apply a torque clamp load of, for example, 300 ft.lbs. during tightening of the fastening means 28. The mechanic is further instructed to then mount the fastening means 28 on the O spokes and to apply a torque clamp load not to exceed, for example, 250 ft.lbs.

What is claimed is:

1. A dual rim and wheel assembly, said rims having mounting flanges, including as clamping elements sets of axially inner clamp means and of axially outer clamp lugs, each set of a clamp means and a clamp lug having a and being supported by a common fastening element extending axially through a bore in said wheel, each fastening element carrying a fastening means which when tightened will move a clamp means and a clamp lug to cooperatively engage said mounting flanges of dual rims separated by a spacer, each of said wheel bores opening onto a radially oriented boss surface, wherein, certain of said boss surfaces are axially extended further than an adjacent boss surface so that a clamp lug supported by a fastening element will bottom against the wheel boss surface when a fastening means therefore is tightened.

* * * * *